United States Patent [19]

Jang

[11] Patent Number: 5,643,134
[45] Date of Patent: Jul. 1, 1997

[54] HYDRAULIC CONTROL SYSTEM OF AN AUTOMATIC TRANSMISSION FOR AUTOMATIVE VEHICLES

[75] Inventor: Jaeduk Jang, Kyungki-do, Rep. of Korea

[73] Assignee: Hyundai Motor Company, Rep. of Korea

[21] Appl. No.: 647,743

[22] Filed: May 15, 1996

[30] Foreign Application Priority Data

May 26, 1995 [KR] Rep. of Korea ............... 95-13459

[51] Int. Cl.⁶ ............................................. F16H 61/26
[52] U.S. Cl. ...................... 477/130; 477/116; 477/127; 477/131
[58] Field of Search ........................ 477/116, 126, 477/127, 130–131

[56] References Cited

U.S. PATENT DOCUMENTS

| | | | |
|---|---|---|---|
| 5,364,317 | 11/1994 | Amemiya | 477/116 X |
| 5,501,645 | 3/1996 | Taniguchi et al. | 477/131 X |
| 5,540,634 | 7/1996 | Jang et al. | 477/131 |
| 5,540,635 | 7/1996 | Jang | 477/135 |
| 5,556,356 | 9/1996 | Hakamada et al. | 477/130 X |
| 5,565,000 | 10/1996 | Jang | 477/130 |

*Primary Examiner*—Charles A. Marmor
*Assistant Examiner*—Peter T. Kwon
*Attorney, Agent, or Firm*—Finnegan, Henderson, Farabow, Garrett & Dunner, L.L.P.

[57] ABSTRACT

A hydraulic control system of an automatic transmission for an automotive vehicle which may simplify a structure, minimize a shift shock for improving a shift responsiveness, and improve shift quality even in a driven state by a manual range shift and a power off state.

8 Claims, 12 Drawing Sheets

HYDRAULIC CONTROL SYSTEM OF AN AUTOMATIC TRANSMISSION FOR AUTOMATIVE VEHICLES

BACKGROUND

The present invention relates to a hydraulic control system of an automatic transmission for an automotive vehicle, and in particular to a hydraulic control system for automotive vehicles which has a simplified structure, minimizes shift shock for improving shift responsiveness, and improves shift quality even in a driven state by a manual range shift and a power off state.

A conventional vehicle automatic transmission has a torque converter and a multiple stage transmission gear mechanism connected with the torque converter, and the transmission includes a hydraulically-actuated friction member for selecting one among a plurality of gear stages of the transmission gear mechanism in accordance with vehicle running conditions.

The hydraulic control system, which controls the operation of the friction members, selectively operates the friction members with hydraulic pressure generated by a hydraulic pump via a control valve. The hydraulic control system comprises a pressure control means for controlling hydraulic pressure generated by the hydraulic pump, a manual and automatic transmission control means that makes it possible to shift various transmission modes, a hydraulic control means for controlling the shift quality and responsiveness to form smooth transmission mode when shifting, a damper clutch control means for operating a damper clutch of a torque converter, a hydraulic pressure distribution means for supplying proper hydraulic pressure to each friction member.

The hydraulic control means regulates the supply line pressure exerting on the friction members, the torque converter supply pressure, and a solenoid valve supply pressure. These types of hydraulic pressure substantially affect on the shift quality.

Therefore, while shifting, it is preferable to supply controlled hydraulic pressure in order to operate friction members, and after this, to change the operating pressure of each friction member into drive pressure.

With this in mind, the present applicant disclosed a hydraulic control system which makes it possible to operate the friction members with drive pressure after operating the friction members with torque pressure in Korean Patent Application No. 94-37992.

However, when shifting manually and driven condition is at a power-off state, since there is no control process for these, shifting shock may occur.

SUMMARY

The present invention is made in an effort to solve the above described problems. It is an object of the present invention to provide a hydraulic control system which has a simplified structure and minimizes shifting shock while improving shift responsiveness, and improves shift quality when the selective shift lever is shifted and driven condition is in an off state.

It is another object of the invention to provide a hydraulic control system for automotive vehicles which may improve shift quality by torque pressure generated from the solenoid valve when manually shifting a range selector lever from a "D" range to a "2" range and from the "D" range to a "L" range.

It is still another object of the invention to provide a hydraulic control system for automotive vehicles which may improve shift quality by torque pressure generated from the solenoid valve during gear shifting from a third speed to a second speed and from a fourth speed to second speed at the "D" range.

Therefore, to achieve the above objects, the present invention provides the hydraulic control system of an automatic transmission for automotive vehicles, comprising:

a hydraulic pump for generating hydraulic pressure by receiving driving force from an engine when the engine is running;

a pressure control valve varying hydraulic pressure supplied from the hydraulic pump according to the vehicle's driving state;

a solenoid supply valve supplying first, second, third solenoid valves with line pressure to be supplied along a line pressure conduit from the pressure control valve;

a manual valve interconnected with a shift select lever and supplying hydraulic pressure to a drive pressure conduit at the "D" range and to a reverse pressure conduit at the "R" range while varying each port of the valves;

a torque control regulator valve for changing torque pressure by a duty control of the third solenoid valve while receiving drive pressure from the manual valve;

a control switch valve for selectively supplying torque pressure to a first torque pressure conduit or a second torque pressure conduit in accordance with an on/off operation of a fourth solenoid valve as receiving torque pressure from the torque control regulator valve;

an N–D control valve for supplying drive pressure to a fifth friction member after first feeding torque pressure thereto to prevent shift shock, the fifth friction member being applied together with a first friction member which is applied by receiving line pressure during an initial shift operation when the shift selector lever is shifted from the "N" range to the "D" range;

a 1–2 speed shift valve for supplying drive pressure fed from the manual valve to the fifth friction member through a second clutch valve and torque pressure fed from the first and second torque pressure conduits in a 1–2 speed shift operation at the "D" range by an on/off control of a fifth solenoid valve;

a 2–3 speed shift valve for feeding torque pressure fed from the 1–2 shift valve and part of hydraulic pressure fed to a third friction member to a second friction member through a third clutch valve when shifting from a second speed to a third speed at "D" range while changing a port by an on/off control of a sixth solenoid valve, and for providing a passage for drive pressure and torque pressure of a manual valve when shifting from a third speed of the "D" range to a first speed of the "L" range;

a 3–4 speed shift valve for supplying torque pressure fed from the 2–3 shift valve and part of the hydraulic pressure fed to the second friction member to a third friction member through a fourth clutch valve, for obstructing the hydraulic pressure supply of the first friction member when shifting from a third speed to a fourth speed at "D" range while changing a port by an on/off control of a seventh solenoid valve, and for supplying hydraulic pressure fed to a second torque pressure conduit to a seventh friction member through the third clutch valve and the second clutch valve when manually shifting from a fourth speed of "D" range to a second speed of "2" range; and an N-R control valve for supplying hydraulic pressure fed from a manual valve through a reverse pressure conduit to a sixth friction member while changing a port by control of a third solenoid valve at "R" range.

The 2-3 shift valve which supplies hydraulic pressure to the second friction member when shifting from the second speed to the third speed, comprising:

a valve body provided with a first port receiving hydraulic pressure by being connected to a third port of the 1-2 speed shift valve, a second port receiving hydraulic pressure by being connected to a fourth port of the 1-2 speed shift valve, a third port receiving hydraulic pressure of a line pressure conduit, a fourth port supplying fifth and sixth ports of the 1-2 speed shift valve with line pressure of the third port, a fifth port receiving line pressure of the fourth port controlled by the sixth solenoid valve, a sixth port receiving part of the hydraulic pressure fed to the fifth friction member, a seventh port selectively feeding hydraulic pressure fed to the first port or the sixth port to the third clutch valve, an eighth port directly connected to the first torque pressure conduit, a ninth port directly connected to a conduit fed with hydraulic pressure at the "L" range state, a tenth port feeding hydraulic pressure fed to the sixth port to the third clutch valve, an eleventh port for feeding hydraulic pressure flowing into the second port to a 3-4 speed shift valve; and a valve spool having a first land, on the opposite side of which hydraulic pressure of the third port and the fifth port respectively act, a second land, on which some hydraulic pressure of the first port acts, a third land selectively connecting the sixth port to the tenth port, a fourth land selectively connecting the seventh port to the eighth port, a fifth land selectively connecting the second port to the eleventh port.

The 3-4 shift valve supplying hydraulic pressure for releasing the first friction member and applying the third friction member when shifting from the third speed to the fourth speed, comprising;

a valve body having a first port fed with hydraulic pressure from the eleventh port of the 2-3 shift valve, a second port fed with some of the hydraulic pressure fed to the second friction member, a third port connected to the second torque pressure conduit, a fourth port fed with line pressure from the line pressure conduit, a fifth port fed with line pressure controlled by the fifth solenoid control valve, a sixth port feeding hydraulic pressure fed to the first port to the fourth clutch valve, a seventh port fed with drive pressure from the manual valve at "2", "L" ranges, and an eighth port feeding hydraulic pressure fed to the seventh port to the seventh friction member via the third clutch valve and the second clutch valve; and a valve spool including a first land, on the opposite side of which hydraulic pressure of the fourth port and the fifth port respectively act, a second land on which some hydraulic pressure of the second port acts, a third land selectively connecting the third port to the eighth port, and a fourth land selectively connecting the seventh port to the eighth port.

The second clutch valve fed with hydraulic pressure from the 1-2 speed shift valve, comprising;

a valve body having a first port receiving hydraulic pressure from the 1-2 speed shift valve, a second port feeding hydraulic pressure fed to the first port to the third friction member and the 2-3 speed shift valve, a third port fed with hydraulic pressure from the seventh port of the 2-3 speed shift valve, a fourth port feeding hydraulic pressure fed to the third port to the sixth friction member, a fifth port receiving hydraulic pressure as a result of being connected to the third shift valve, and the sixth port for feeding hydraulic pressure fed to the fifth port to the seventh friction member; and a valve spool having a first land for selectively connecting the first port to the second port, a second land for selectively connecting the third port to the fourth port, a third land for disconnecting the third port with the fifth port, and a fourth land biased by a spring for selectively connecting the fifth port and the sixth port.

The third clutch valve comprises:

a valve body having a first port fed with hydraulic pressure from the 2-3 speed shift valve, a second port for feeding hydraulic pressure fed to the first port to the second friction member and the 3-4 speed shift valve at the "2" and "L" ranges, the third port for receiving drive pressure of the manual valve via the eighth port of the 3-4 speed shift valve, and the fourth port for feeding hydraulic pressure fed to the third port to the fifth port of the second clutch valve; and a valve spool having a first land for selectively connecting the first port to the second port, a second land for selectively connecting the third port to the fourth port, and a third land biased by a spring.

The fourth clutch valve comprises:

a valve body having a first port for receiving hydraulic pressure from the 3-4 speed shift valve, a second port feeding hydraulic pressure fed to the first port to the fifth friction member, a third port for receiving hydraulic pressure from a line pressure conduit, and a fourth port for feeding hydraulic pressure fed to the third port to the first friction member; and a valve spool having a first land for selectively connecting the first port to the second port, a second land for selectively connecting the third port to the fourth port, and a third land biased by a spring.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION

Figure 1:
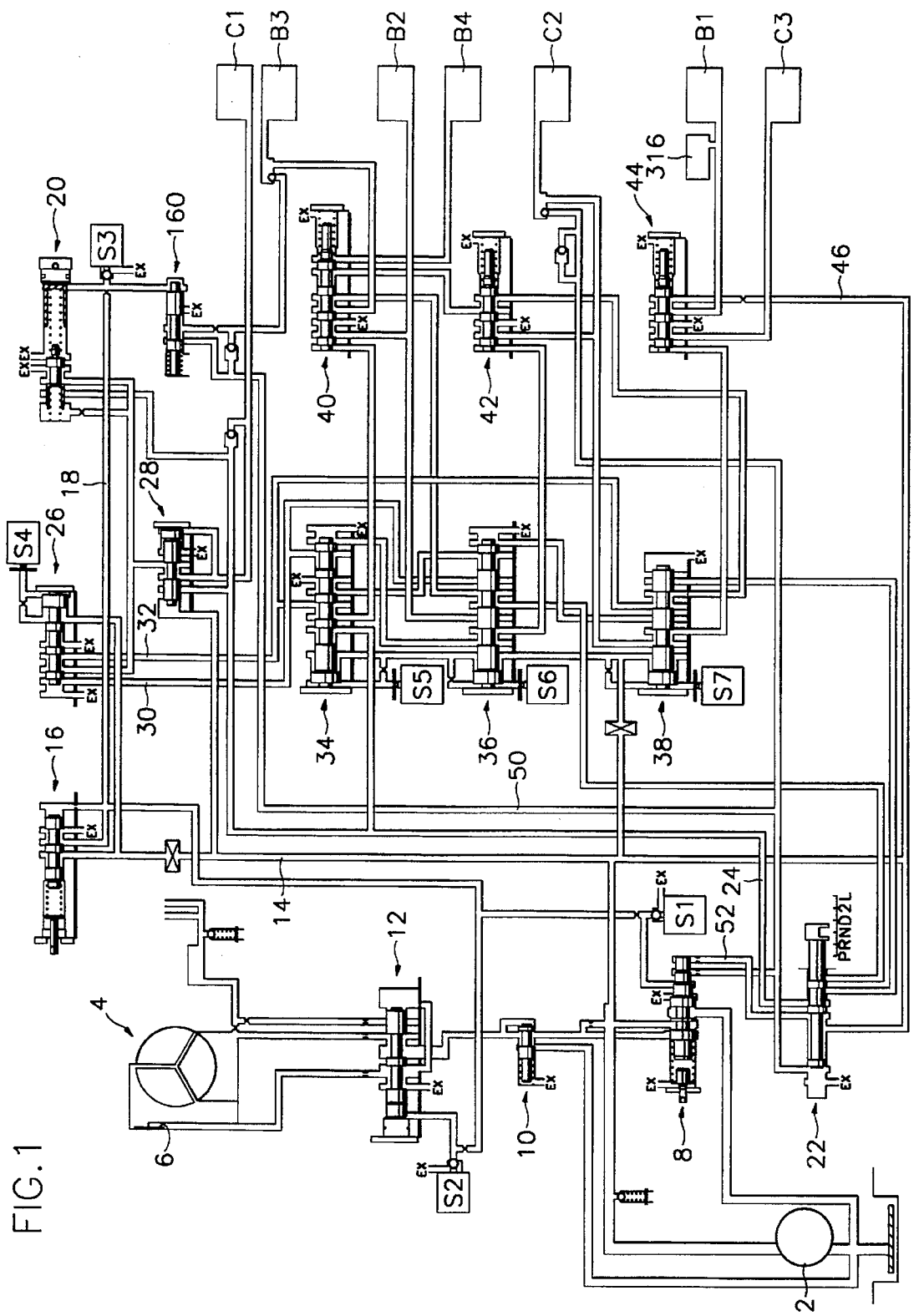
FIG. 1 is a hydraulic circuit diagram of a hydraulic control system according to a preferred embodiment of the present invention.

Referring to FIG. 1, a hydraulic control system according to a preferred embodiment of the present invention comprises a hydraulic pump 2 for pumping oil by the driving force of an engine, a torque converter 4 for transmitting engine driving force to an input shaft of a transmission, a damper clutch 6 disposed in the torque converter 4 to increase power train efficiency, a pressure regulator valve 8 varying hydraulic pressure generated by the hydraulic pump in accordance with the vehicle's driving conditions, a converter feed valve 10 feeding hydraulic pressure passing through this pressure regulator valve 8 to the torque converter and lubricant places, and a converter clutch control valve 12 controlling the operation of the damper clutch.

The pressure control valve 8 and the converter clutch valve 12 both varying their ports according to solenoid valves S1, S2 a duty controlled by a transmission control unit(TCU).

The pressure regulator valve 8, connected with a solenoid supply valve 16 through a line pressure conduit 14, which feeds hydraulic pressure to the solenoid supply valve 16. The hydraulic pressure passing through the solenoid supply valve 16 is designed to be fed to the first and second solenoid valves S1, S2, and to the third solenoid valve S3 through a conduit 18.

The third solenoid valve S3 is connected in order to be capable of controlling port variation of a torque control regulator valve 20. The torque control regulator valve 20, by being connected to the manual valve 22 interconnected with a shift selector lever(not shown) for varying ports as receiving hydraulic pressure from the line pressure conduit 14 and connected to a drive pressure conduit 24, receives the hydraulic pressure.

The torque control regulator valve 20 feeds torque pressure controlled by the third solenoid valve 83 to a control switch valve 26, and further feeds torque pressure to an N–D control valve 28 for reducing shifting shock occurring when shifting from neutral N to the drive D range.

The N–D control valve 28 feeds at the initial shift operation torque pressure to a first friction member C1 operated together with a fourth friction member B1 operated as directly receiving line pressure at the shift beginning, and then changes apply pressure of the first friction member C1 into drive pressure by changing its port, thereby reducing shift shock.

In order to selectively supply torque pressure fed to the control switch valve 26 to first and second torque pressure conduits 30 and 32, a fourth solenoid valve S4 is on/off controlled by the TCU.

The first and second torque conduits 30, 32 are connected to a 1–2 shift valve 34 for feeding drive pressure fed from a drive pressure line 24 to a fifth friction member B2, while port conversion is accomplished according to an on/off control of a fifth solenoid valve S5 controlled by the TCU when shifting from first speed to second speed.

A 2–3 shift valve 36 changing a port in accordance with an on/off control of a sixth solenoid valve S6 controlled by the TCU at the third speed, feeds part of the hydraulic pressure flowing to the fifth friction member B2 to a second friction member C2, thereby accomplishing a shift control of the third speed. A 3–4 shift valve 38 changing a port in accordance with a seventh solenoid valve S7 controlled by the TCU, feeds part of the hydraulic pressure flowing to the second friction member C2 to a third friction member C3.

A second clutch valve 40, which is fed with hydraulic pressure from the 1–2 shift valve 34 at the second speed of "D" range, feeds this hydraulic pressure to the fifth friction member B2 and 2–3 shift valve. In addition, the second clutch valve 40 is connected to a third clutch valve 42 connected to the 3–4 shift valve 38, thereby feeding hydraulic pressure to a sixth friction member B3 or a seventh friction member B4.

The third clutch valve 42, receives hydraulic pressure from the 2–3 shift valve 36, and then feeds the pressure to the second friction member C2 to operate this friction member, as well as to the 3–4 shift valve 38.

A fourth clutch valve 44 receives the hydraulic pressure from the said 3–4 shift valve 38 to operate the third friction member C3. The fourth clutch valve 44 is connected to a conduit 46 branched off from the line pressure conduit 14, thereby operating the fourth friction member B1 always operated at the "D" range. The hydraulic system of the invention with above composition will be described hereinbelow in detail.

Figure 2:
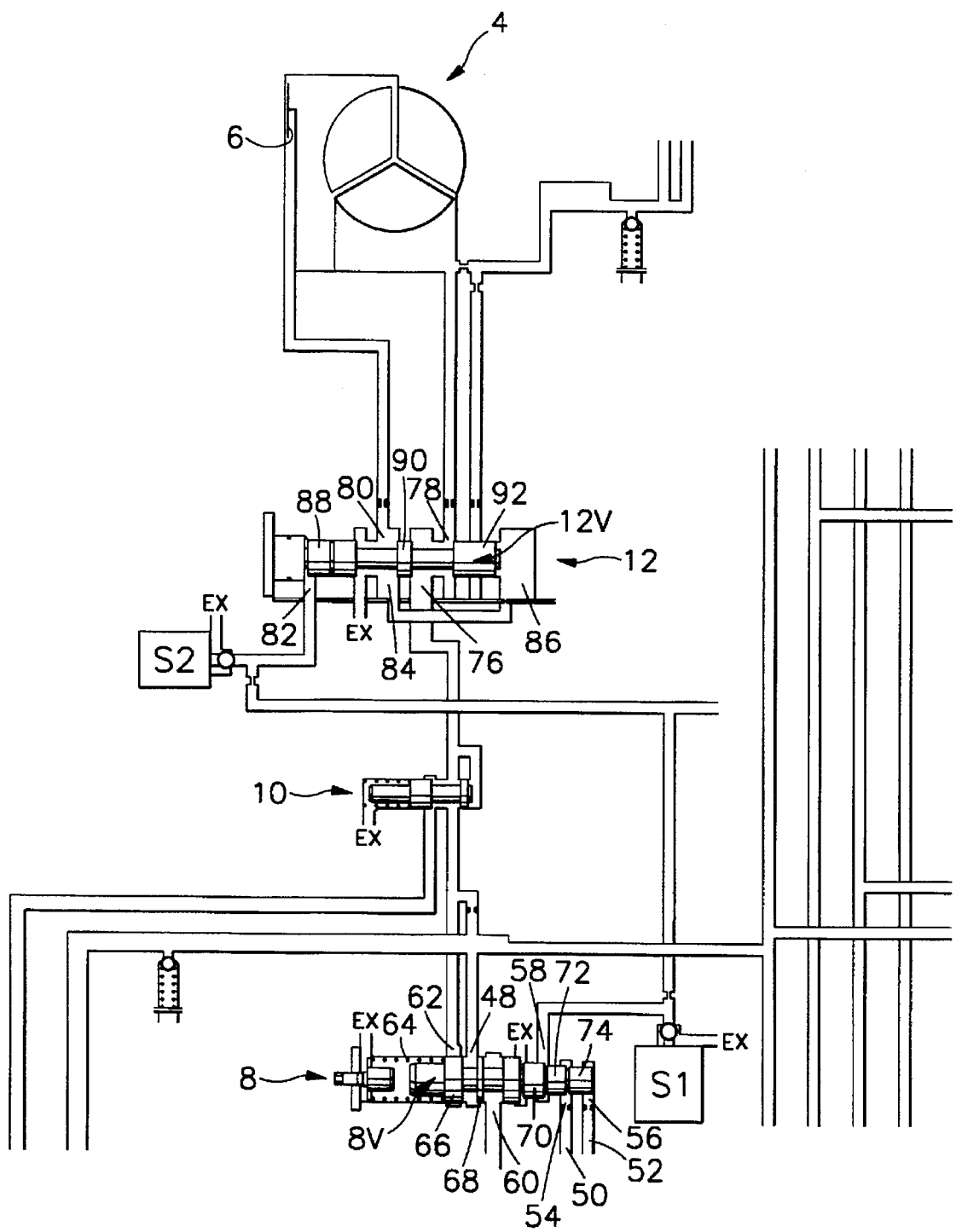
FIG. 2 is a detailed view of a pressure regulating section of the hydraulic control system according to a preferred embodiment of the present invention.

FIG. 2 shows a pressure regulating section of the hydraulic system. The pressure regulating valve 8 is provided with a first port 48 for receiving hydraulic pressure fed from the hydraulic pump 2, second and third ports 54, 56 for receiving hydraulic pressure by being connected to the manual valve 22, a reverse pressure conduit 50 and a main conduit 52 respectively, a fourth port 58 for receiving hydraulic pressure controlled by the first solenoid valve S1, a fifth port 60 for discharging a rest hydraulic pressure, and a sixth port 62 for feeding hydraulic pressure to the control feed valve 10.

The pressure regulating valve includes a valve spool 8V having a first land 66 for opening and closing the sixth port 62 while being biased by a spring 64, a second land 68 for regulating opening ratio of the fifth port 60 to exhaust hydraulic pressure, third, fourth, fifth lands 70, 72, 74 on each of which hydraulic pressure coming through the fourth, the second, third ports 58, 54, 56 act on respectively different pressure levels.

The converter feed valve 10 receiving hydraulic pressure from the sixth port 62 is connected to be able to supply converter clutch regulation valve 12 with hydraulic pressure thereto.

The converter clutch valve 12 serves as a means for operating or releasing the damper clutch 6 of the torque converter 4, and feeding oil to each lubricant portion of the transmission. This is done by the second solenoid valve S2 variably controlled by the TCU.

This converter clutch regulation valve 12 is provided with a first port 76 for receiving hydraulic pressure, a second port 78 for feeding hydraulic pressure to operate the damper clutch 6, a third port 80 for feeding hydraulic pressure to release operation of the damper clutch 6, a fourth port 82 for forming or releasing hydraulic pressure on or from the second solenoid valve S2, and fifth and sixth ports 84, 86 for feeding hydraulic pressure which resists hydraulic pressure fed to the fourth port 82.

The converter clutch regulation valve 12 includes a valve spool 12V having a first land 88 on which hydraulic pressure coming through the fourth port 82 acts, a second land 90 for selectively connecting the first port 76 to the second port 78 or the third port 80, and a third land 92 on which hydraulic pressure coming through the sixth port 86 acts.

Figure 3:
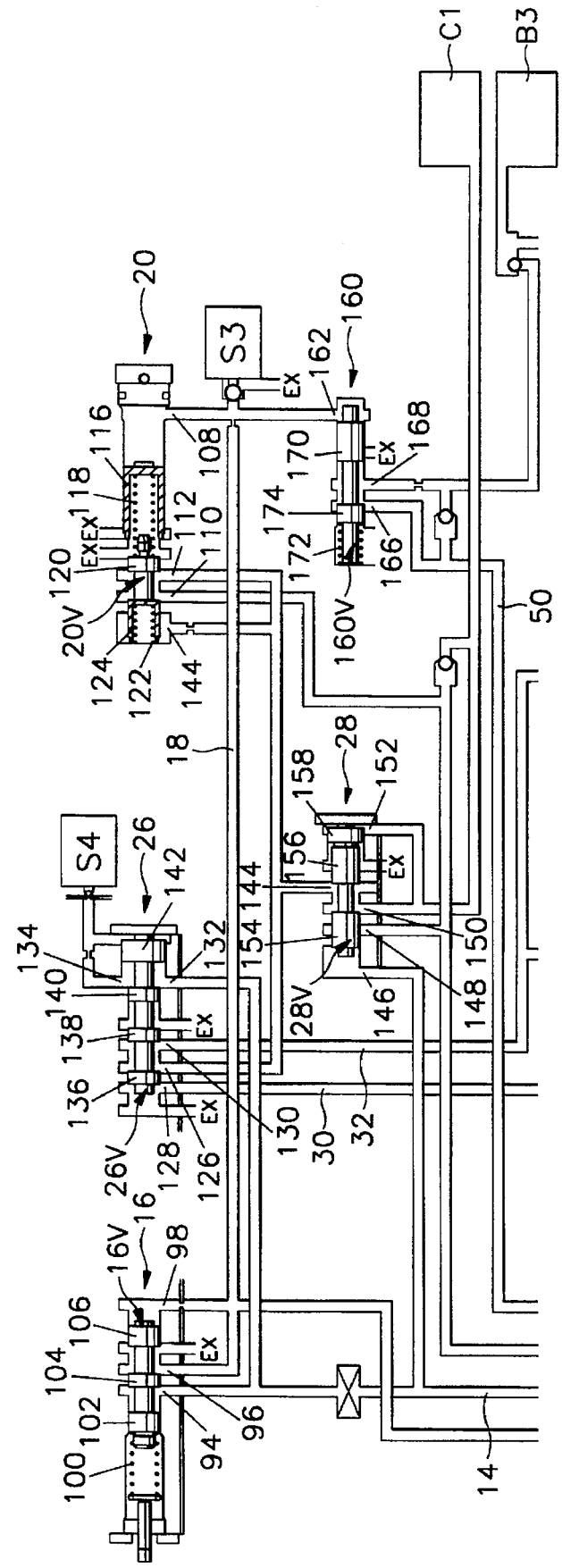
FIG. 3 is a detailed view of a torque pressure conversion section of the hydraulic control system according to a preferred embodiment of the present invention.

FIG. 3 shows a torque pressure control section of the present invention. A solenoid supply valve 16 which feeds line pressure fed from the pressure regulation valve 8 along the line pressure conduit 14 to the first, second, and third solenoid valves S1, S2, S3, is provided with a first port 94 connected to the line pressure conduit 14, a second port 96 for feeding hydraulic pressure coming through the first port 94 to the conduit 18, and a third port 98 relating to port conversion by receiving hydraulic pressure from the second port 96.

The solenoid supply valve 16 includes a valve spool 16V of the solenoid supply valve 16 having a first land 102 biased by a spring 100, a second land 104 for varying the opening ratio of the second port 96, and a third land 106 being operated by hydraulic pressure fed to the third port 98.

The torque control regulator valve 20 which is controlled by an on/off operation of the third solenoid valve S3 is provided with, a first port 108 for receiving control pressure, a second port 110 for receiving hydraulic pressure flowing along the drive pressure conduit 24 from the manual valve 22, and third and fourth 112, 114 ports for selectively receiving hydraulic pressure coming through the second port 110 in accordance with port conversion.

This valve includes a first plug 116 for being moved by hydraulic pressure fed to the first port 108, a spring 118 biasing this first plug 116, a land 120 biased on its one end by the spring 118, and a second plug 124 biased by a spring 122.

The control switch valve 26 selectively receiving hydraulic pressure from the second and third ports 110, 112 of the torque control regulator valve 20 is provided with a first port 126 for selectively receiving hydraulic pressure from the third port 112 of the torque control regulator valve 20, second and third ports 128, 130 for selectively exhausting hydraulic pressure which is fed to the first port 126, a fourth port 132 for directly receiving hydraulic pressure from the line pressure conduit 14, and a fifth port 134 which is connected to the fourth solenoid valve S4 to apply hydraulic pressure on a spool in a direction opposed to that of hydraulic pressure of the fourth port for changing a port.

A valve spool 26V having a first land 136 for opening or closing the first and second ports 126, 128, a second land 138 opening or closing the first and third ports 126, 130, a third land 140 on which hydraulic pressure of the fourth port 132 acts, and a fourth land 142 on which hydraulic pressure of the fifth port 134 acts.

Furthermore, the N–D control valve 28, reducing shifting shock when shifting from neutral mode to running mode by receiving torque pressure from the torque control regulator valve 20, includes a first port 144 receiving torque pressure, a second port 146 receiving line pressure, a third port 148 receiving drive pressure, a fourth port 150 for feeding hydraulic pressure fed to the third port 148 to the first friction member C1, and a fifth port 152 that changes ports by receiving hydraulic pressure coming through the fourth port 150.

The N–D control valve 28 includes a valve spool 28V having a first land 154 on which hydraulic pressure of the second port 146 acts, a second land 156 disconnecting hydraulic pressure fed to the said first port 144, and a third land 158 on which hydraulic pressure of the fifth port 152 acts.

An N–R control valve 160 feeding hydraulic pressure to the sixth friction member B3 includes a first port 162 for receiving control pressure of the third solenoid valve S3, a second port 166 for receiving reverse pressure from the manual valve 22 along the reverse conduit 50, and a third port 168 for feeding rear pressure fed to the second port 166 to the sixth friction member B3.

A valve spool 160V of the N–R control valve 160 has a first land 170 on which the hydraulic pressure of the first port 162 acts, and a second land 174 opening as well as closing the second port 166, wherein the second land is biased by a spring 172.

Figure 4:
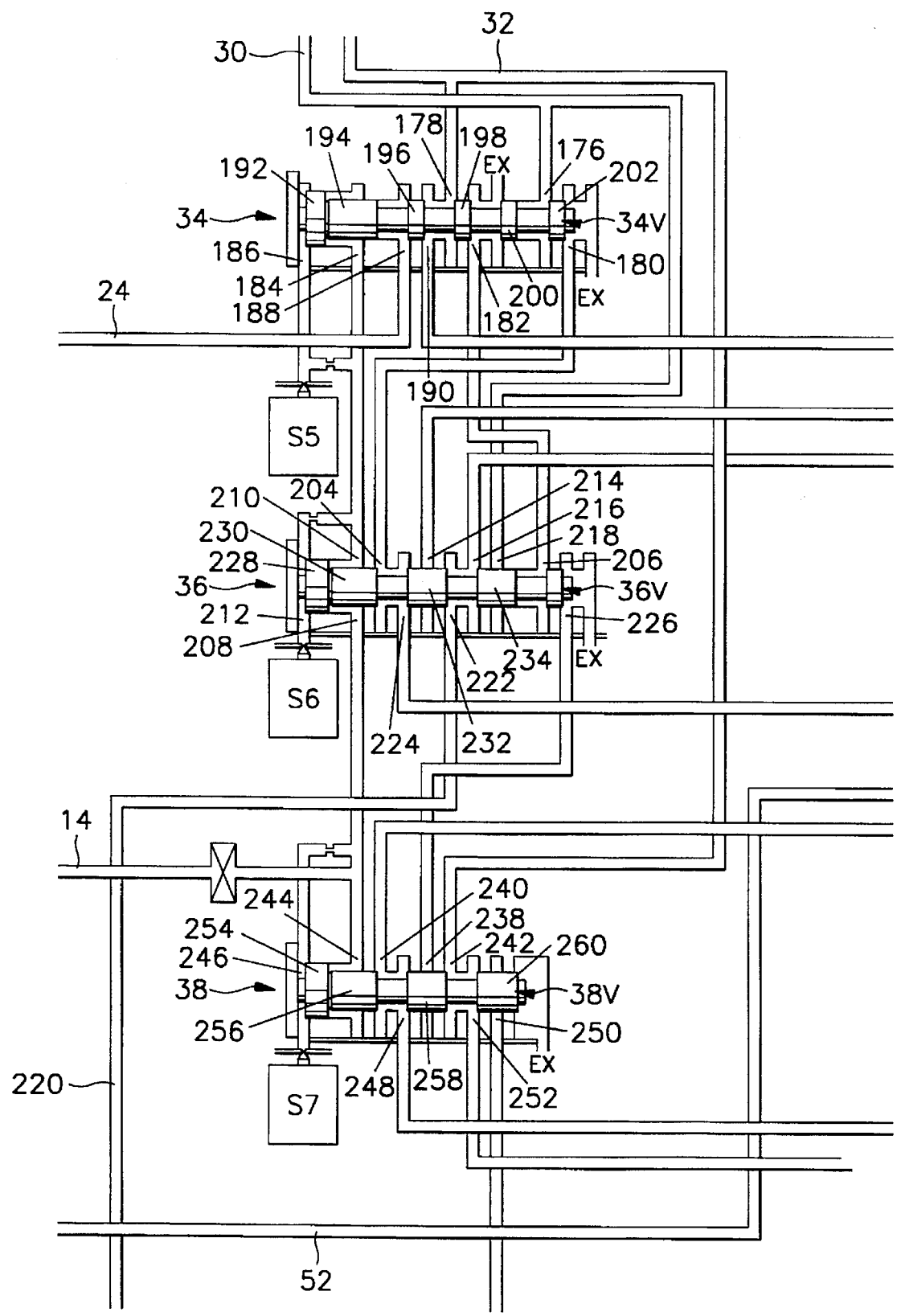
FIG. 4 is a drawing showing a first shift control section of the hydraulic control system according to the present invention.

FIG. 4 shows a first shift control section of the hydraulic control system according to the present invention. The 1–2 shift valve 34 for feeding operating hydraulic pressure to the fifth friction member B2 when shifting from first speed to second speed at "D" range, is provided with first and second ports 176, 178 for respectively receiving torque pressure from the first, second torque pressure conduits 30, 32.

The 1–2 shift valve 34 includes a third port 180 for feeding hydraulic pressure fed to the first port 176 to the 2–3 shift valve 36, and a fourth port 182 for feeding hydraulic pressure fed to the second port 178 to the 2–3 shift valve 36.

The shift valve 34 includes a fifth port 184 fed with the line pressure from the line pressure conduit 14 through the 2–3 shift valve 36, a sixth port 186 fed with the line pressure from the line pressure conduit 14 by on/off control, a seventh port 188 for receiving hydraulic pressure from the drive pressure conduit 24, and an eighth port 190 for feeding the hydraulic pressure of the second port 188 to the second clutch valve 40.

The shift valve 34 includes a valve spool 34V having a first land 192 on the opposite side of which hydraulic pressure of the fifth and sixth ports 184, 186 acts, a second land 194 on which hydraulic pressure of the seventh port 188 acts, a third land 196 for connecting or disconnecting the eighth port 190 to the seventh port 188, a fourth land 198 for selectively connecting the second port 178 to the seventh port 188 or the eighth port 190, a fifth land 200 on which part of hydraulic pressure coming through the first port 176 acts, and a sixth land 202 on which hydraulic pressure of the third port 180 acts.

A 2–3 shift valve feeding hydraulic pressure to the second friction member C2 when shifting from second speed to third speed, is provided with a first port 204 for receiving hydraulic pressure by connection of the third port 180 of the 1–2 shift valve 34, a second port 206 for receiving hydraulic pressure by connection of the fourth port 182 of the 1–2 shift valve 34, a third port 208 for receiving hydraulic pressure of the line pressure conduit 14, and a fourth port 210 for feeding line pressure of the third port 208 to the fifth and sixth ports 184, 186 of the 1–2 shift valve 34.

The 2–3 shift valve is provided with a fifth port 212 for receiving a line pressure of the fourth port 210 by control of the sixth solenoid valve S6, a sixth port 214 receiving part of the hydraulic pressure of the fifth friction member B2, a seventh port 216 for selectively feeding hydraulic pressure fed to the first and sixth ports 204, 214 to the third clutch valve 42, an eighth port 218 directly connected to the first torque pressure conduit 30, a ninth port 222 connected to a conduit 220 receiving hydraulic pressure at the "L" range, a tenth port 224 for feeding hydraulic pressure fed to the sixth port 214 to the third clutch valve 42, and an eleventh port 226 for feeding hydraulic pressure coming through the second port 206 to the 3–4 shift valve 38.

The 2–3 shift valve 86 includes a valve spool 36V having a first land 228, on the opposite side of which, hydraulic pressure of the third and fifth ports 208, 212 acts, a second land 232 for selectively connecting the sixth port 214 to the tenth port 224, a fourth land 234 for selectively connecting the seventh port 216 to the eighth port 218, and a fifth land 236 for selectively connecting the eleventh port 226 to the second port 206.

The 3–4 shift valve 38 which releases the fourth friction member B1 and applies the third friction member C3 when shifting from third speed to fourth speed, is provided with a first port 238 for receiving hydraulic pressure from the eleventh port 226 of the 2–3 shift valve 36, a second port 240 for receiving part of the hydraulic pressure fed to the second friction member C2, a third port 242 connected to the second torque pressure conduit 32, a fourth port 244 for receiving line pressure from the line pressure conduit 14, a fifth port 246 for receiving line pressure by the control of a seventh solenoid S7.

The 3–4 shift valve 38 is provided with a sixth port 248 for feeding hydraulic pressure fed to the port 238 to the fourth clutch valve 44, a seventh port 250 for receiving drive pressure from the manual valve 22 at "2" and "L" ranges, and an eighth port 252 for feeding hydraulic pressure fed to the seventh port 250 to the seventh friction member B4 via the third, second clutch valves 42, 40.

The 3–4 shift valve 38 includes a valve spool 38V having a first land 254 on the opposite side of which hydraulic pressure of the fourth and fifth ports 244, 246 acts, a second land 256 on which part hydraulic pressure of the second port 240 acts, a third land 258 for selectively connecting the eighth port 252 to the third port 242, and a fourth land 260 for selectively connecting the eighth port 252 to the seventh port 250.

Figure 5:
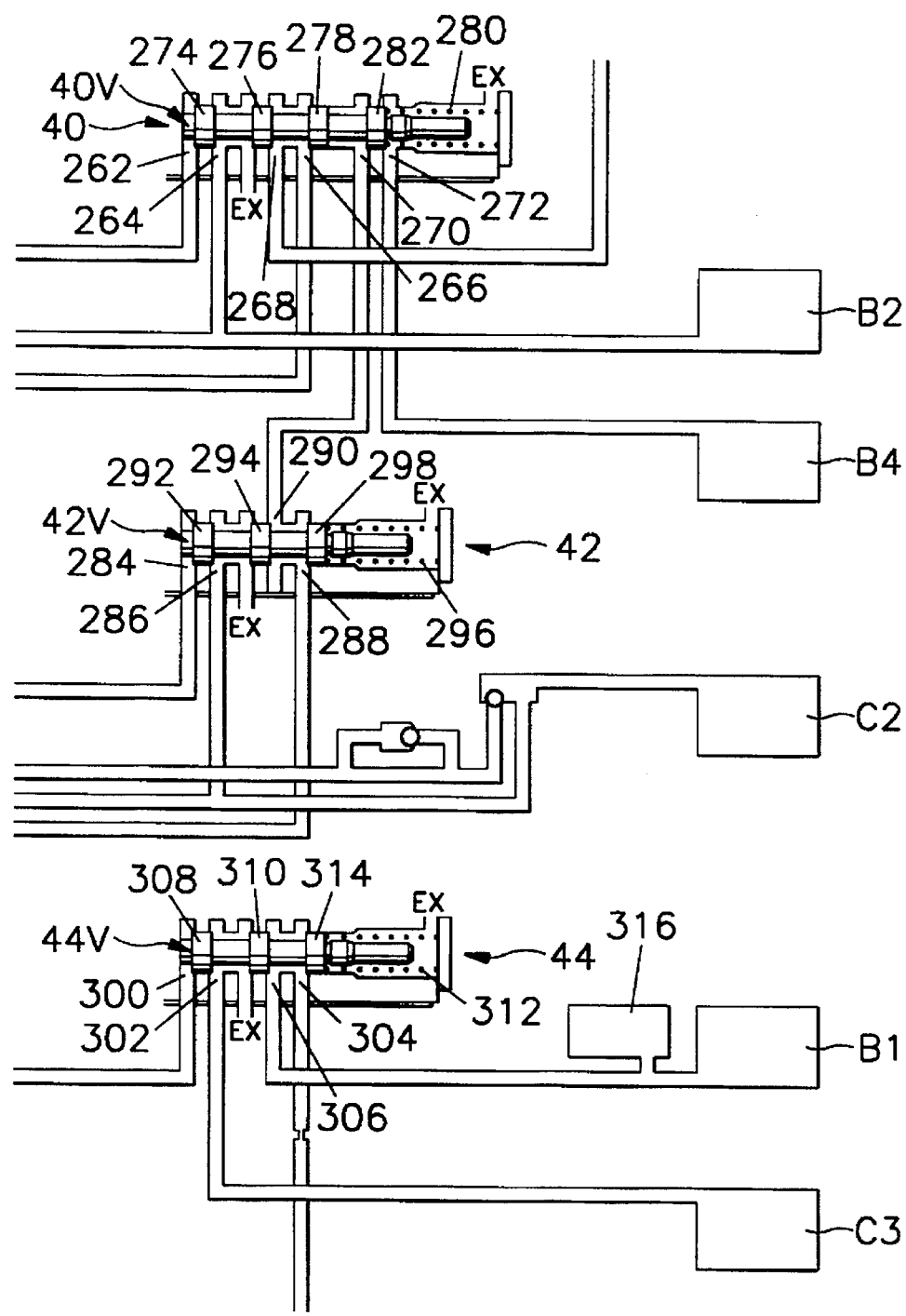
FIG. 5 is a drawing showing a second shift control section of the hydraulic control system according to the present invention.

FIG. 5 is a drawing showing a second shift control section of the hydraulic control system according to the present invention. The second clutch valve 40 receiving hydraulic pressure from the 1–2 shift valve 34, is provided with a first port 262 for receiving hydraulic pressure from the 1–2 shift valve 34, and a second port 264 for feeding hydraulic pressure fed to this first port 262 to the fifth friction member B2 and the 2–3 shift valve 36.

The second clutch valve 40 is provided with a third port 266 for receiving hydraulic pressure from the seventh port 216 of the 2–3 shift valve 36, a fourth port 268 for feeding hydraulic pressure fed to this third port 266 to the sixth friction member B3, a fifth port 270 for receiving hydraulic pressure through the third shift valve 42, and a sixth port 272 for feeding hydraulic pressure fed to this fifth port 270 to the seventh friction member B4.

The second clutch valve 40 includes a valve spool 40V having a first land 274 for selectively connecting the second port 264 to the first port 262, a second land 276 for selectively connecting the fourth port 268 to the third port 266, a third land 278 for disconnecting the fifth port 270 from a third port 266, and a fourth land 282 biased by a spring 280 to selectively connect a sixth port 272 to the fifth port 270.

The third clutch valve 42 feeding hydraulic pressure of the 2–3 shift valve 36 to the second friction member C2 is provided with a first port 284 for receiving hydraulic pressure from the 2–3 shift valve 36, a second port 286 for feeding hydraulic pressure of the first port 284 to the second friction member C2 and the 3–4 shift valve 38, a third port 288 for receiving drive pressure of the manual valve 22 via the eighth port 252 of the 3–4 shift valve 38 at "2" and "L" ranges, and a fourth port 290 for feeding hydraulic pressure fed to this third port 288 to the fifth port 270 of the second clutch valve 40.

The third clutch valve 42 includes a valve spool 42V having a first land 292 for selectively connecting the first port 284 to the second port 286, a second land 294 for selectively connecting the third port 288 to the fourth port 290, and a third land 298 biased by a spring 296.

The fourth clutch valve 44 which supplies line pressure to the fourth friction member B1 at first, second, third speeds of "D" range and to the third friction member C3 at fourth speed, is provided with a first port 300 for receiving hydraulic pressure from the 3–4 shift valve 38, a second port 302 for feeding hydraulic pressure fed to the first port 300 to the third friction member C3, a third port 304 for receiving hydraulic pressure from the line pressure conduit 14, and a fourth port 306 for feeding hydraulic pressure fed to this third port 304 to the fourth friction member B1.

The fourth clutch valve 44 includes a valve spool 44V having a first land 308 for selectively connecting the first port 300 to the second port 302, a second land 310 for selectively connecting the third port 304 to the fourth port 306, and a third land 314 biased by a spring 312.

The valve spool 44V includes an accumulator 316 arranged on the conduit which connects the third friction member C3 to the fourth port 306.

The following is the description of a shift process at each shift stage of the hydraulic control system.

When starting an engine, because of varying hydraulic pressure fed to the fourth port 58 of pressure regulation valve 8 while the first solenoid valve S1 of the hydraulic control system is varying controlled, hydraulic pressure acted on the third land 70 increases or decreases, so that the fifth port 60 communicates with the first port 48 thereby discharging or closing the hydraulic pressure generated from the hydraulic pump 2.

By this operation, the line pressure is controlled, so that it is supplied to the first port 94 of the solenoid supply valve 16 and discharged through the second port 96. Some hydraulic pressure from the second port 96 is supplied to the third port 98 and acts on the right side of the third land 106, thereby making the valve spool 16V of the solenoid supply valve 16 move to the right as viewed from the drawing.

With this operation, the second land 104 partially closes the second port 96, so that the hydraulic pressure fed to the third port 98 through the second port 104 is substantially lowered, whereby the valve spool 16V is moved to the right again by the elastic force of the spring 100.

As this operation is repeated, the hydraulic pressure through the second port 104 is supplied to the first port 108 of the torque control regulator valve 20. The hydraulic pressure supplied to the first port 108 forms high or low hydraulic pressure with the on/off operation of the third solenoid valve S3 so that the first plug 16 is variably moved.

As the third solenoid valve S3 is controlled to be at an off state, the first plug 116 moves to the left as viewed from the drawing and compresses the spring 118 so that the land 120 moves to the left by the elastic force of the spring.

In this state, when the shift mode is changed from the "N" range to the "D" range, some hydraulic pressure of the line pressure conduit 14 is supplied to the fourth friction element B1 through the fourth clutch valve 44 communicating the third port 304 and the fourth port 306 in a state that the valve spool has moved to the left by the elastic force of the spring 312, thereby engaging it.

At the same time, a portion of the hydraulic pressure flows to the drive pressure conduit 24 via the manual valve 22 and is supplied to the first port 108 of the torque control regulator valve 20.

At this time, the torque control regulator valve 20 moves to the left by the above operation thereby moving the second plug 124 to the left so that the second port 110 is communicated with third port 112 thereby making the hydraulic pressure supplied to the second port 110 to be discharged into the third port 112.

The hydraulic pressure discharged into the third port 112, is fed to the first port 126 of the control switch valve 26 and the first port 144 of the N–D control valve 28.

At this time, part of the hydraulic pressure of the line pressure conduit 14 is fed to the second port 146 of the N–D control valve 28 thereby making the valve spool move to the right as viewed from the drawing, so that the first port 144 of the N–D control valve 28 is being communicated with the second port 150 thereof.

Therefore, the hydraulic pressure fed from the torque control regulator valve 20 to the first port 144, is discharged through the fourth port 150 and is supplied to the first friction member C1.

That is, the first friction member C1 is firstly operated by torque pressure, on the ground that a portion of the hydraulic pressure from the fourth port 150 of the N–D control valve 28 is supplied to the fifth port 152 of the detecting chamber and is acted on right side of the third land 158, the valve spool 28V moves to the left as viewed from the drawing.

Figure 6:
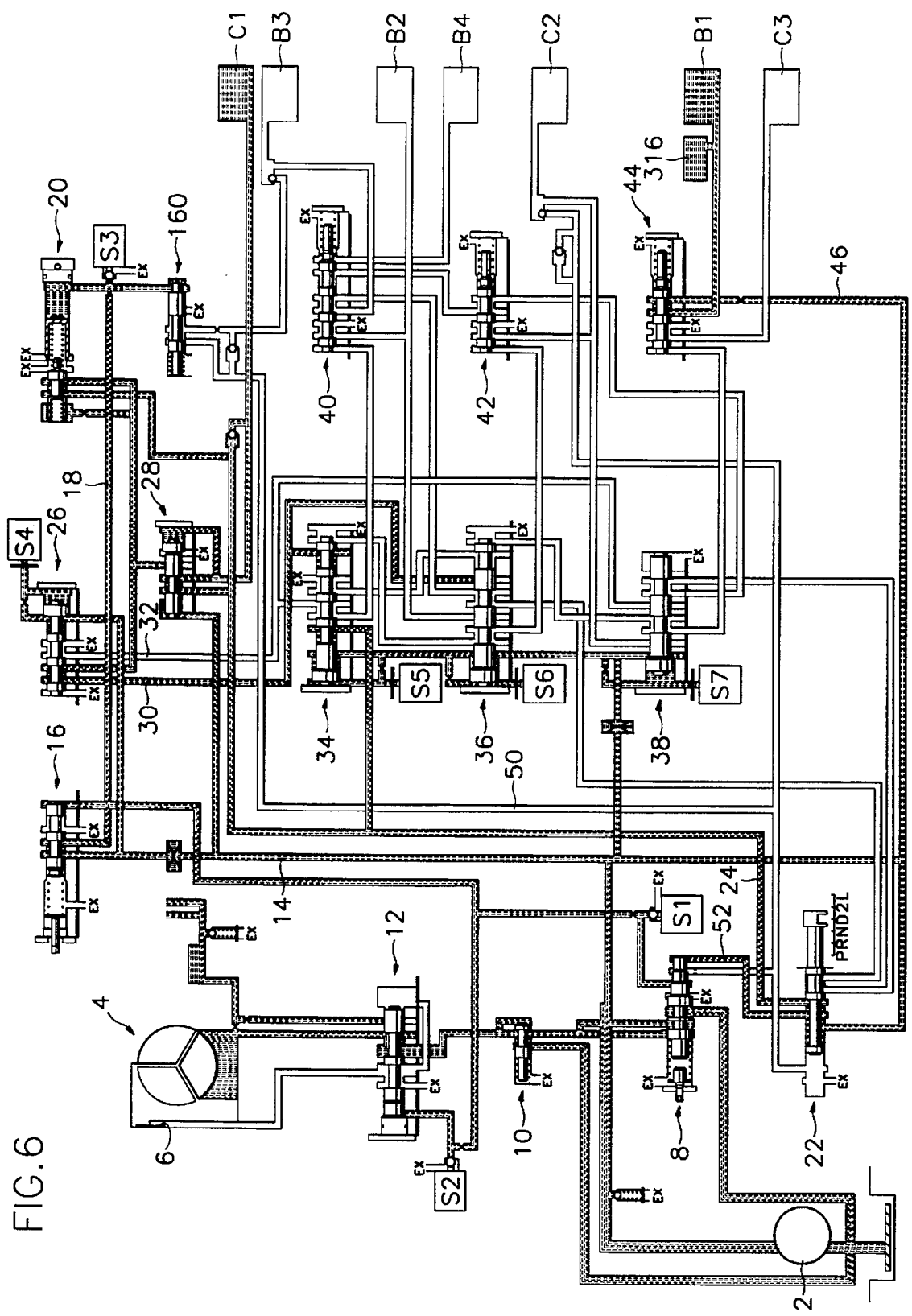
FIG. 6 is the hydraulic circuit diagram of FIG. 1 showing the operation of the hydraulic control system during the first speed of the "D" range.

By this operation, the third port 148 of the N–D control valve 28 communicates with the fourth port 150 thereof so that the drive pressure flowed from the manual valve 22 into the third port 148 is fed to the first friction member C1 thereby completing shifting of the first speed by operation of the first and fourth friction members C1 and B1 (FIG. 6).

In the first speed state, as the speed of the vehicle increases and the opening degree of throttle valve increases, the fourth solenoid valve S4 is controlled to be at an on state and makes the valve spool of the control switch valve 26 move to the right as viewed from the drawing.

By this operation, the torque pressure supplied to the first port 126 is fed to the second port 178 of the 1–2 shift valve 34 along the second torque pressure conduit 32 through the third port 130.

At this time, since the valve spool 34V of the shift valve 34 is maintained to be moved to the left as shown in FIG. 6, the hydraulic pressure fed to the second port 178 is supplied to the first port 262 of the second clutch valve 40 via the eighth port 190.

Then, the valve spool 40V of the second clutch valve 40, since the torque pressure is acted on one side of the first land 274 thereof, overcomes the elastic force of the spring 280 and moves to the right as viewed from the drawing so that the first port 262 communicates with the second port 264, whereby the torque pressure fed to the first port 262 is first supplied to the fifth friction member B2 thereby starting to shift from the first to second speed.

In this state, as the fifth solenoid valve S5 is controlled to an off state, the valve spool 34V of the 1–2 shift valve 34 moves to the right and the seventh port 188 communicates with the eighth port 190, whereby the drive pressure fed to the seventh port 188 is supplied thereto through the eighth port 190.

That is, the fifth friction member B2 is operative-controlled by torque pressure at the beginning of shifting speed. After completing the shift to second speed, it is operated by drive pressure thereby maintaining the second speed state.

As the vehicle speed increases and the opening degree of the throttle valve increases at the second speed, in a state that the first, fourth and fifth friction elements C1, B1 and B2 is maintained to be operated, the fourth solenoid valve S4 is controlled to be at an off state and the valve spool 26V of the control switch valve 26 moves to the left as viewed from the drawing.

By this operation, the torque pressure supplied to the first port 126 is fed to the first port 176 of the 1–2 shift valve 34 along the first torque pressure conduit 30 through the second port 128.

Figure 7:
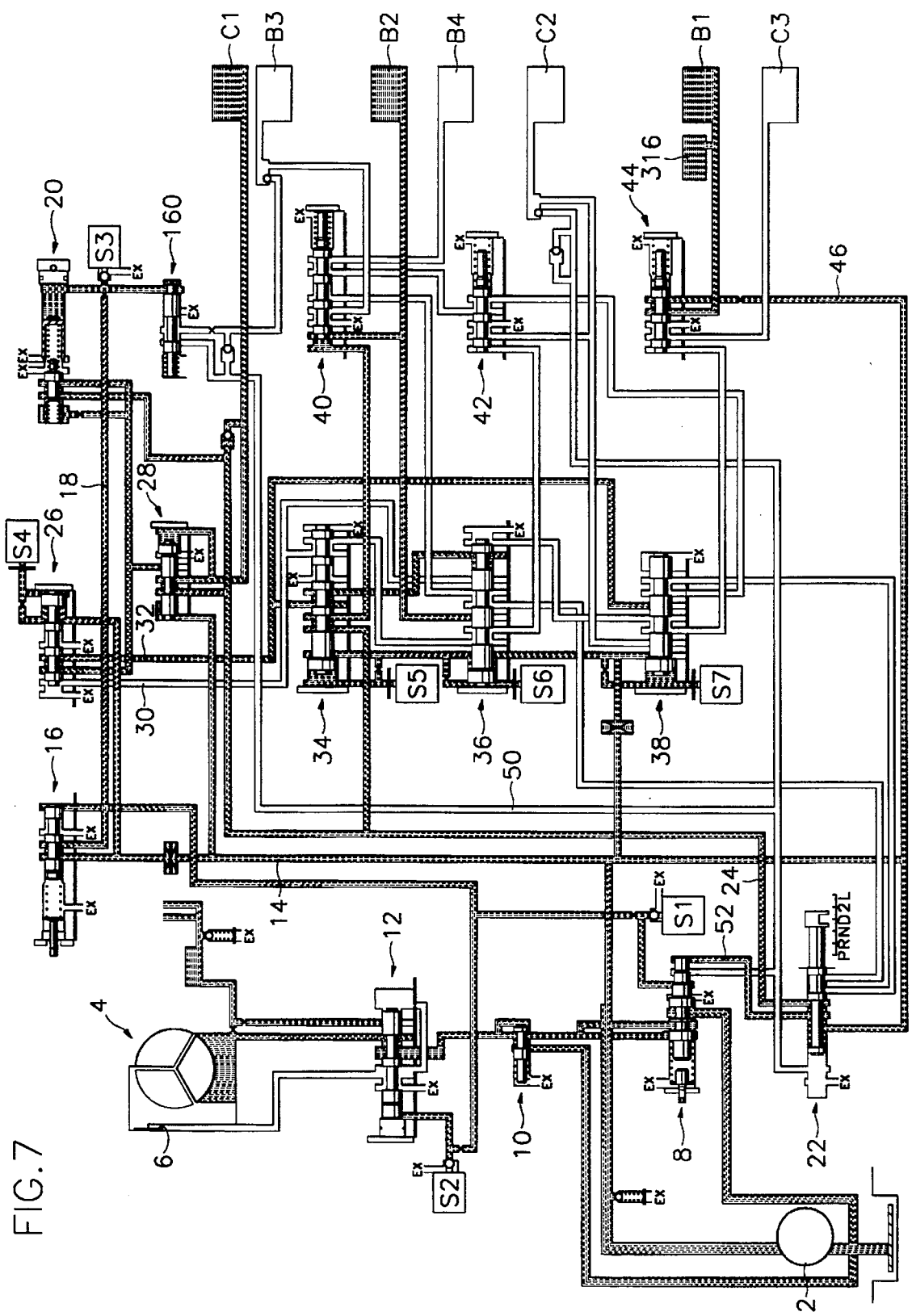
FIG. 7 is the hydraulic circuit diagram of FIG. 1 showing the operation of the hydraulic control system during the second speed of the "D" range.

At this time, since the valve spool 34V of the 1–2 shift valve 34 is maintained to be moved to the right as shown in FIG. 7, the hydraulic pressure fed to the first port 176 is fed to the first port 204 of the 2–3 shift valve 36 through the third port 180. At this time, since the valve spool 36V of the 2–3 shift valve 36 is maintained to be moved to the left as shown in FIG. 7, the first port 204 communicates with the tenth port 224 so that the hydraulic pressure fed to the first port 204 is supplied to the first port 284 of the third clutch valve 42 through the tenth port 224.

Then, the valve spool 42V of the third clutch valve 42, since the torque pressure is acted on one side of the first land 292 thereof, overcomes the elastic force of the spring 296 and moves to the right as viewed from the drawing so that the first port 284 communicates with the second port 286, whereby the torque pressure fed to the first port 284 is first supplied to the second friction member C2 thereby starting to shift from the second to third speed.

In this state, as the sixth solenoid S6 is controlled to be at an off state, the valve spool 36V of the 2–3 shift valve 36 moves to the right and the sixth port 214 communicates with the tenth port 224, whereby the torque pressure fed to the first port 284 is closed and the drive pressure fed to the sixth port 214 is supplied thereto through the tenth port 224 so that the second friction member C2 is operated by the drive pressure.

Figure 8:
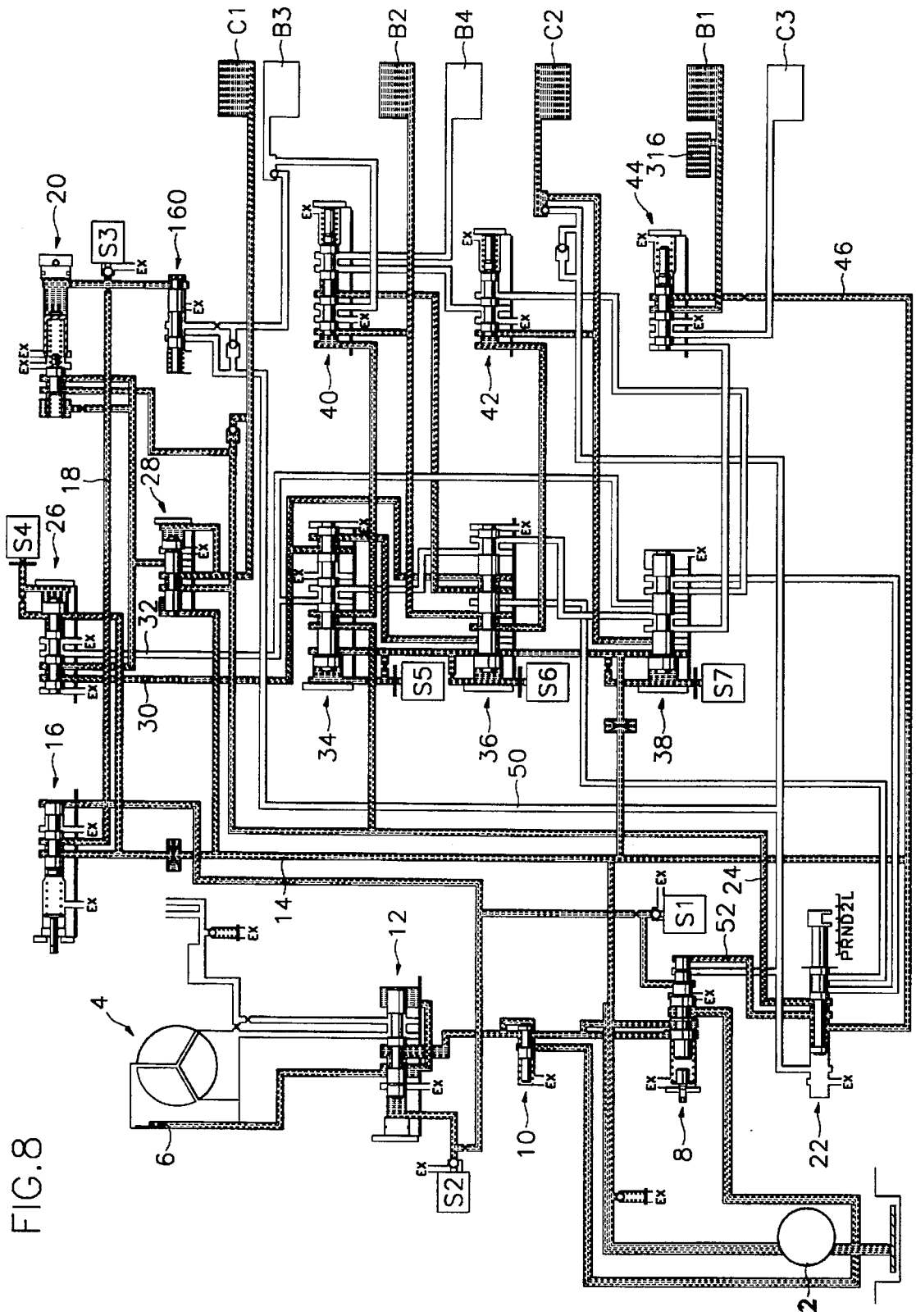
FIG. 8 is the hydraulic circuit diagram of FIG. 1 showing the operation of the hydraulic control system during the third speed of the "D" range.
Figure 9:
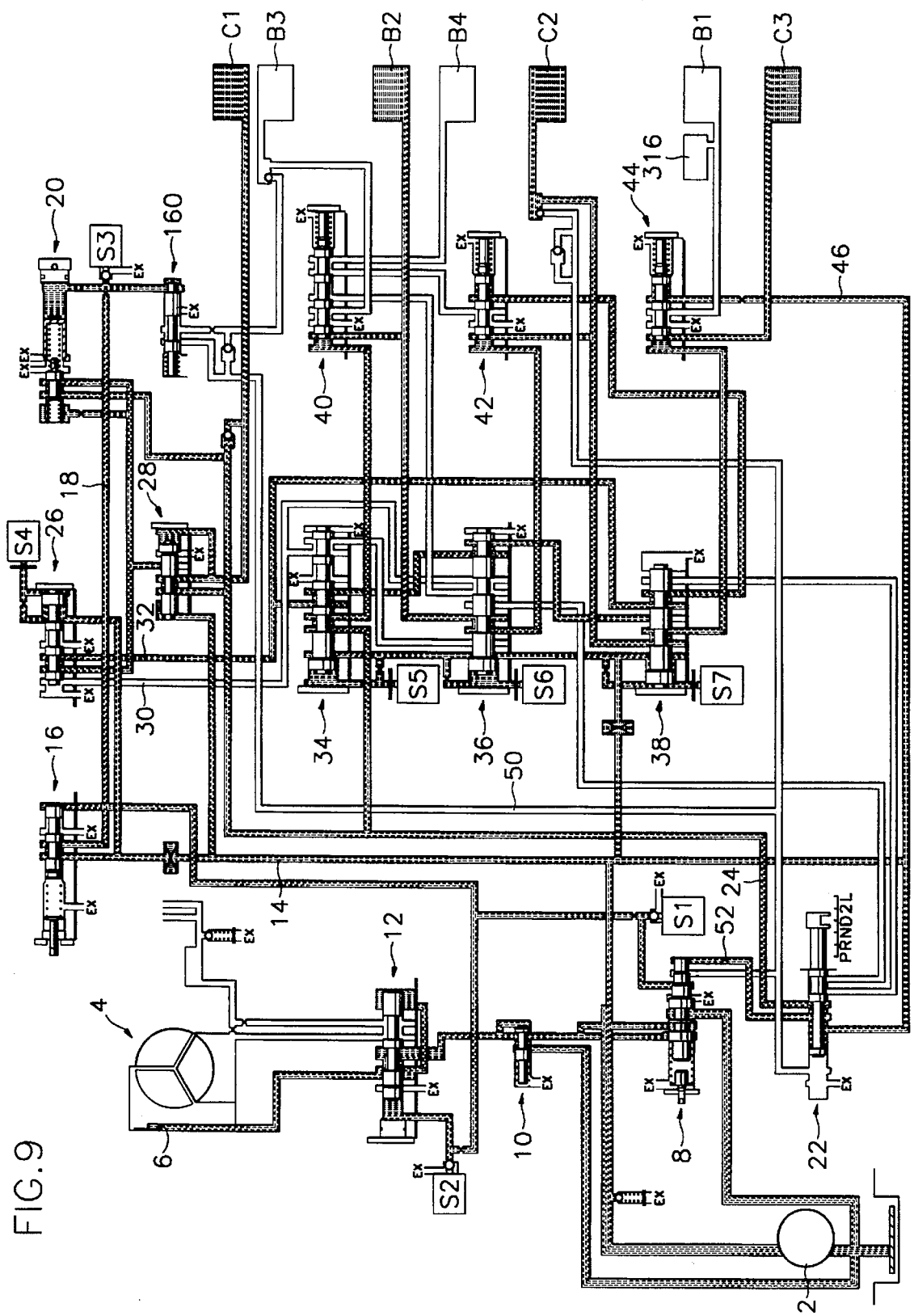
FIG. 9 is the hydraulic circuit diagram of FIG. 1 showing the operation of the hydraulic control system during the fourth speed of the "D" range.

That is, the second friction member C2 is controlled by torque pressure at the beginning of shift thereby shifting to the third speed, and then it is operated by the drive pressure thereby maintaining the third speed state (FIG. 8).

As vehicle speed increases and the opening degree of the throttle valve increases at the third speed, in a state that the first, second, fourth and fifth friction elements C1, C2, B1 and B2 is maintained to be operated, the fourth solenoid valve S4 is controlled to be at an on state and the valve spool 26V of the control switch valve 26 moves to the right, as viewed from the drawing.

By this operation, the torque pressure fed to the first port 126 is supplied to the second port 178 of the 1–2 shift valve 34 and the third port 242 of the 3–4 shift valve 38 along the second torque pressure conduit 32 through the third port 130. The torque pressure fed to the 1–2 shift valve 34 is supplied to the first port 238 of the 3–4 shift valve 38, through the fourth port 182 thereof and the second eleventh ports 206 and 226 of the 2–3 shift valve 36.

Next, since the valve spool of the 3–4 shift valve 38 moved to the right by the off control of the seventh solenoid valve S7, as shown in FIG. 8, this torque pressure is supplied to the first port 300 of the fourth clutch through the sixth port 248 thereby acting on one side of the first land 308 so that the valve spool 44V overcomes the elastic force of the spring 312 and moves to the right, as viewed from the drawing, thereby closing the third port 304 and the fourth port 306, cutting off the line pressure fed to the fourth friction member B1, and communicating the first port 300 and the second port 302 to each other, whereby the torque pressure fed to the first port 300 is firstly supplied to the third friction member C3 through the second port 302 thereby starting the shift from third speed to fourth speed.

In this state, as the seventh solenoid S7 is controlled to be at an off state, the valve spool 38V of the 3–4 shift valve 38 moves to the left and the second port 240 communicates with the sixth port 248, whereby the torque pressure fed to the first port 238 is closed and the drive pressure fed to the second port 240 supplied thereto through the sixth port 248 so that the third friction member C3 is operated by the drive pressure.

That is, the third friction member C3 is operated and controlled by torque pressure at the beginning of shifting speed thereby shifting to fourth speed. After that, it is operated by drive pressure thereby maintaining the fourth speed state.

As described above, the first, second, third and fourth speed shifts of "D" range is accomplished when the overdrive is in the on state. The shift when the overdrive is in the off state is accomplished by the same process as the above mentioned, but the last shift stage is limited to the third speed.

And when the shift mode is changed to reverse R range, some of the hydraulic pressure from the manual valve 22 is supplied to the second and third ports 166 and 168 of the N–R control valve 160, through the reverse pressure conduit 50 of the N–R control valve 160, and supplied to the sixth friction element B3, the reverse friction element, and rest of that is fed to the second friction member C2.

At the same time, some of the hydraulic pressure of the line pressure conduit 14 is fed to the fourth friction member B1 via the fourth clutch valve 44.

At this time, the first port 162 and the second port 166 of the N–R control valve 160 is fed with hydraulic pressure. Since the third solenoid valve S3 is controlled to be at an off state, the valve spool 160V of the valve 160 moves to the left, as viewed from the drawing, thereby communicating the second port 166 and the third port 168 each other, whereby the reverse pressure is supplied to the sixth friction member B3.

Figure 10:
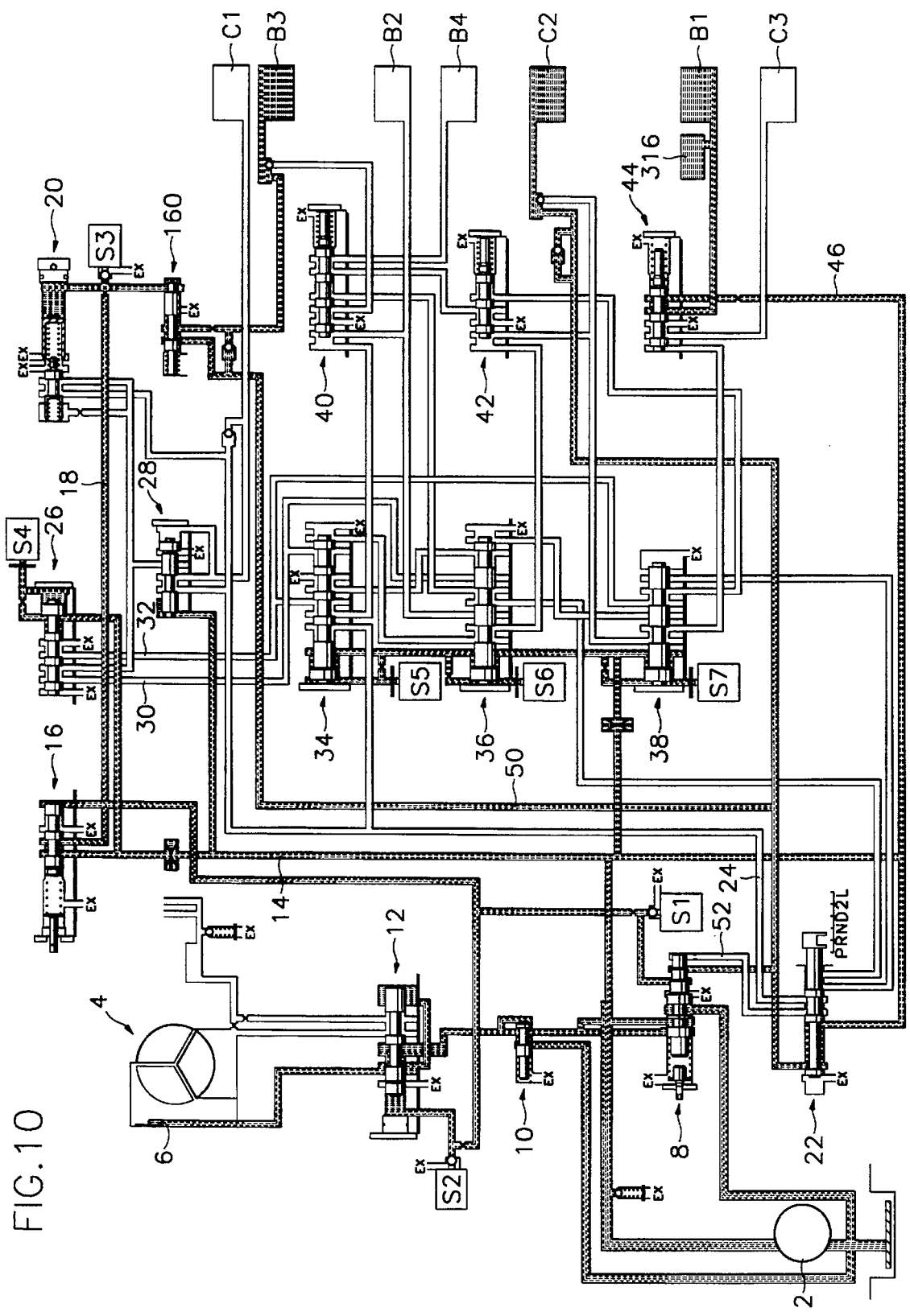
FIG. 10 is the hydraulic circuit diagram of FIG. 1 showing the operation of the hydraulic control system during the reverse speed of the "R" range.

Therefore, the second, fourth and sixth friction members C2, B1 and B3 are engaged at the reverse R range thereby accomplishing the shift (FIG. 10).

The skip control, accomplishing the down shift during driving at "D" range, is carried out from third speed to first speed, from fourth speed to second speed. This is achieved by first speed, second speed operation of each solenoid valve at the third and fourth speed.

Figure 11:
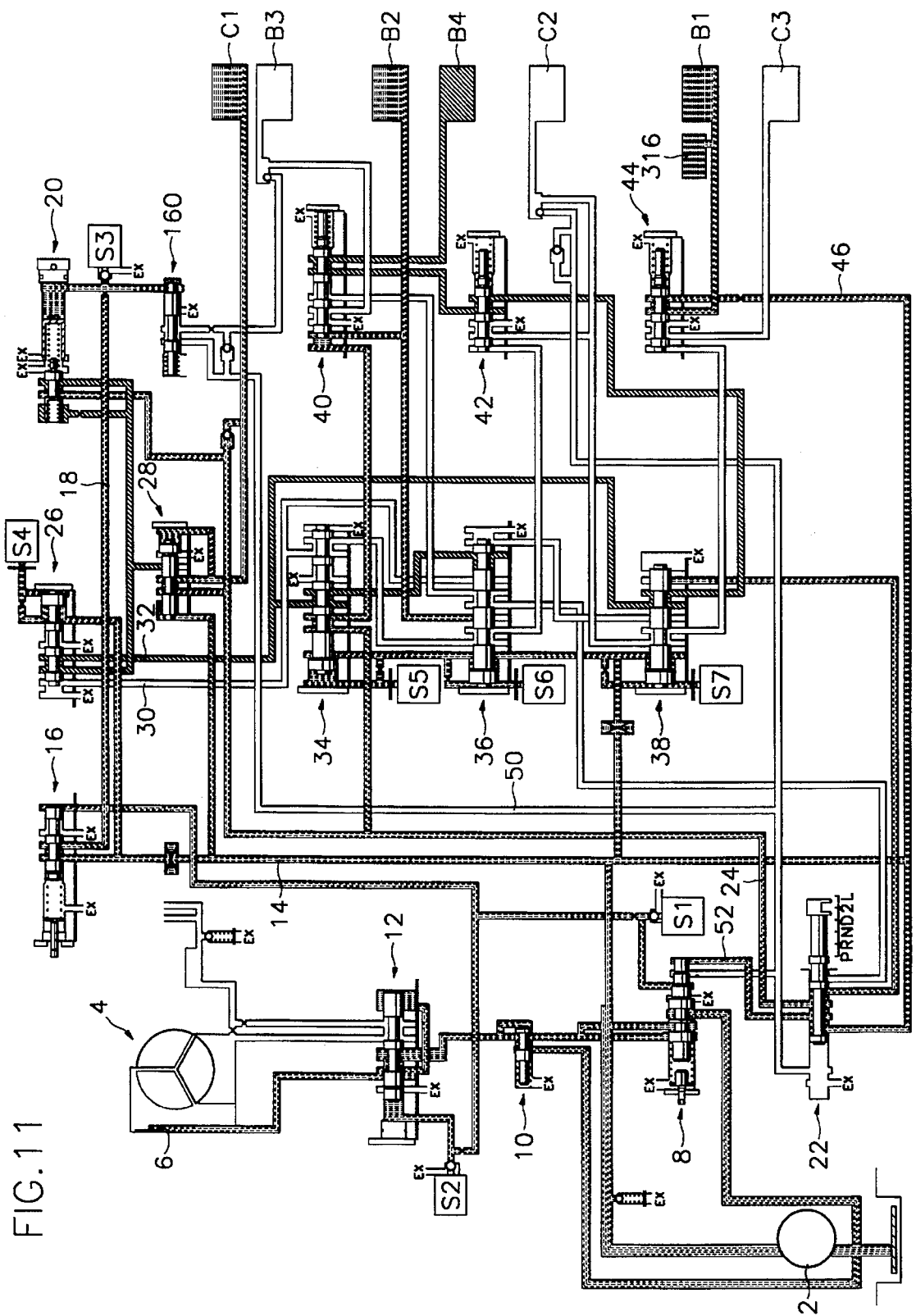
FIG. 11 is the hydraulic circuit diagram of FIG. 1 showing the operation of the hydraulic control system during shifting from a fourth speed of the "D" range to a second speed of the "2" range.

FIG. 11 is the hydraulic circuit diagram when manual shifting to the second speed of the "2" range by the driver's selecting control, wherein the first, second, third and fifth friction members C1, C2, C3 and B2 are operated at the fourth speed, thereby accomplishing the fourth speed driving.

In this state, if the select lever is controlled to the "2" range, the sixth solenoid valve S6 is operated to be from the off state to the on state thereby removing the second and third friction elements C2 and C3.

At this moment, when the third solenoid valve S3 is variably controlled and the fourth solenoid S4 is in the on state, torque pressure fed from torque control regulator valve 20 to the control switch valve 26, is supplied to the second torque pressure conduit 32 through the third port 130.

And this torque pressure is fed to the seventh friction member B4 through the 3–4 shift valve 38 and the third clutch valve 42 thereby operating the seventh friction member thereof, and then the drive pressure supplied from the manual valve by the off operation of the seventh solenoid valve S7, is fed to the seventh friction member B4. At the same time, it is translated to the left side of the valve spool 44V of the fourth clutch valve 44 so that a portion of the line pressure is fed to the fourth friction element thereby operating the fourth friction member.

That is, when manually shifting from the fourth speed of the "D" range to the second speed of the "2" range, torque pressure operates the seventh friction member B4 and then the drive pressure from the manual valve 22 is fed thereto, thereby decreasing the shift impact(FIG. 11).

In FIG. 11, a fluid conduit is marked with deviant lines, and this is for showing that the drive pressure is formed only at the second speed of the "2" range, not at the second speed of the "D" range.

Figure 12:
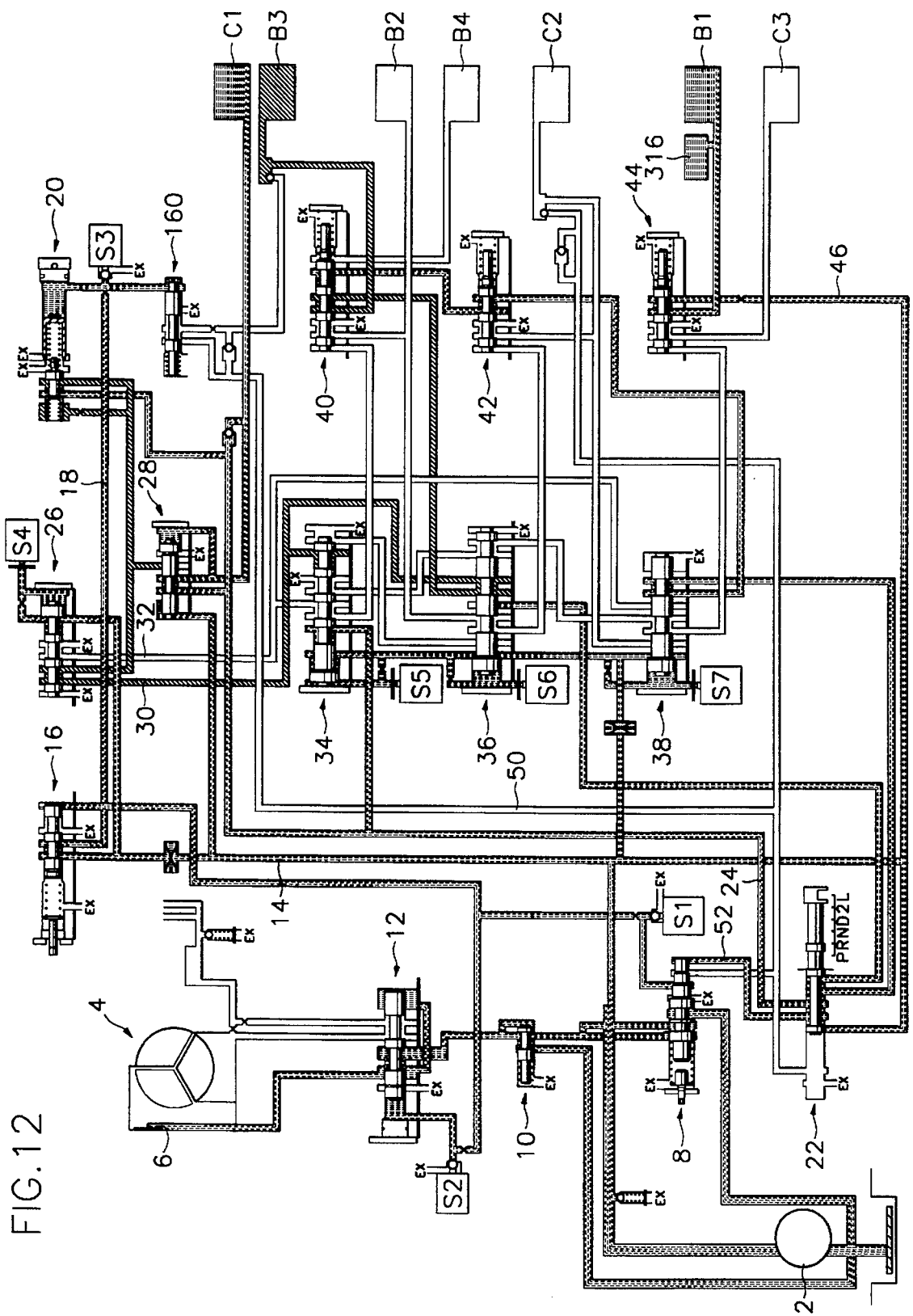
FIG. 12 is the hydraulic circuit diagram of FIG. 1 showing the operation of the hydraulic control system during shifting from a third speed of the "D" range to a first speed of the "2" range.

FIG. 12 shows the operation during shifting from the third speed of the "D" range to the first speed of the "2" range. If shifting mode is changed to the "L" range by the select lever during driving at the third speed of the "D" range, the third solenoid S3 is controlled to be at the off state, in a state shown in FIG. 8, and the fifth solenoid S5 is controlled from the off state to the on state, whereby the supply of hydraulic pressure of the second friction member C2 and the fifth friction member B2 is cut off. At the same time, the torque pressure operates and controls the sixth friction element B3 through the 2–3 shift valve 36 and the second clutch valve 40, thereby shifting to the first speed of the "L" range, and then compensates with the drive pressure supplied from the manual valve 22.

In FIG. 12, a fluid conduit is marked with deviant lines, and this is for showing that the drive pressure is formed only at the first speed of the "L" range not at the first speed of the "D" range.

As described above, the hydraulic pressure control system according to the present invention has a simplified structure by removing the prior manual shift valve, and when manual shifting from the fourth speed of the "D" range to "2" range, the torque pressure operates and controls the seventh friction member and then compensates with the drive pressure, thereby improving shift quality.

Also, when shifting from the third speed of the "D" range to the first speed of the "L" range, the fourth friction element is operated and controlled by the torque pressure and then compensates with the drive pressure fed from the manual valve thereby improving shift quality at the manual shift mode.

And when the driven condition is at a power-off state, the shifting to the first and second speed during the third, fourth speed driving of the "D" range, is accomplished by the same method as the manual control method thereby greatly improving shift quality.

At this moment, the sixth and seventh friction elements engaged for braking are disengaged.

What is claimed is:

1. A hydraulic control system of an automatic transmission for automotive vehicles, comprising:

a hydraulic pump for generating hydraulic pressure by receiving driving force from an engine when the engine is running;

a pressure control valve varying hydraulic pressure supplied from the hydraulic pump according to a vehicle's driving state;

a solenoid supply valve supplying first, second, third solenoid valves with line pressure to be supplied along a line pressure conduit from the pressure control valve;

a manual valve interconnected with a shift select lever and supplying hydraulic pressure to a drive pressure conduit at the "D" range and to a reverse pressure conduit at the "R" range while varying each port of the valves;

a torque control regulator valve for changing torque pressure by a duty control of the third solenoid valve as receiving drive pressure from the manual valve;

a control switch valve for selectively supplying torque pressure to a first torque pressure conduit or a second torque pressure conduit in accordance with an on/off operation of a fourth solenoid valve as receiving torque pressure from the torque control regulator valve;

an N–D control valve for supplying drive pressure to a fifth friction member after feeding torque pressure thereto to prevent shift shock, the fifth friction member being applied together with a first friction member which is applied by receiving line pressure during an initial shift operation when the shift selector lever is shifted from the "N" range to the "D" range;

a 1–2 speed shift valve for supplying drive pressure fed from the manual valve to the fifth friction member through a second clutch valve and torque pressure fed from the first and second torque pressure conduits in a 1–2 speed shift operation at the "D" range in accordance with an on/off control of a fifth solenoid valve;

a 2–3 speed shift valve for feeding torque pressure fed from the 1–2 shift valve and part of the hydraulic pressure fed to a third friction member to a second friction member through a third clutch valve when shifting from a second speed to a third speed at "D" range while changing ports by an on/off control of a sixth solenoid valve, and for providing a passage through which drive pressure and torque pressure of a manual valve when shifting from a third speed of the "D" range to a first speed of the "L" range;

a 3–4 speed shift valve for supplying a torque pressure fed from the 2–3 shift valve and part of the hydraulic pressure fed to the second friction member to a third friction member through a fourth clutch valve, for obstructing the hydraulic pressure supply of the first friction member when shifting from a third speed to a fourth speed at "D" range while changing ports by an on/off control of a seventh solenoid valve, and for supplying hydraulic pressure fed to a second torque pressure conduit to a seventh friction member through the third clutch valve and the second clutch valve when manually shifting from a fourth speed of "D" range to a second speed of "2" range; and an N–R control valve for supplying hydraulic pressure fed from manual valve through a reverse pressure conduit to a sixth friction member while changing a port by control of a third solenoid valve at "R" range.

2. The hydraulic control system according to claim 1, wherein the 2–3 shift valve which supplies hydraulic pressure to the second friction member, when shifting from the second speed to the third speed, comprising:

a valve body provided with a first port receiving hydraulic pressure by being connected to a third port of the 1–2 speed shift valve, a second port receiving hydraulic pressure by being connected to a fourth port of the 1–2 speed shift valve, a third port receiving hydraulic pressure of a line pressure conduit, a fourth port supplying fifth and sixth ports of the 1–2 speed shift valve with line pressure of the third port, a fifth port receiving line pressure of the fourth port controlled by the sixth solenoid valve, a sixth port receiving part of the hydraulic pressure fed to the fifth friction member, a seventh port selectively feeding hydraulic pressure fed to the first port or the sixth port to the third clutch valve, an eighth port directly connected to the first torque pressure conduit, a ninth port directly connected to a conduit fed with hydraulic pressure at "L" range state, a tenth port feeding hydraulic pressure fed to the sixth port to the third clutch valve, an eleventh port for feeding hydraulic pressure flowing into the second port to a 3–4 speed shift valve; and a valve spool having a first land on the opposite side of which hydraulic pressure of the third port and the fifth port respectively acts, a second land on which some hydraulic pressure of the first port act, a third land selectively connecting the sixth port to the tenth port, a fourth land selectively connecting the seventh port to the eighth port, a fifth land selectively connecting the second port to the eleventh port.

3. The hydraulic control system according to claim 1, wherein the 3–4 shift valve supplying hydraulic pressure for releasing the first friction member and applying the third friction member when shifting from the third speed to the fourth speed, comprising:

a valve body having a first port fed with hydraulic pressure from the eleventh port of the 2–3 shift valve, a second port fed with some of the hydraulic pressure fed to the second friction member, a third port connected to the second torque pressure conduit, a fourth port fed with line pressure from the line pressure conduit, a fifth port fed with line pressure controlled by the fifth solenoid control valve, a sixth port feeding hydraulic pressure fed to the first port to the fourth clutch valve, a seventh port fed with drive pressure from the manual valve at "2" "L" ranges, and an eighth port feeding hydraulic pressure fed to the seventh port to the seventh friction member via the third clutch valve and the second clutch valve; and a valve spool including a first land the opposite side of which hydraulic pressure of the fourth port and the fifth port respectively act, a second land on which some hydraulic pressure of the second port acts, a third land selectively connecting the third port to the eighth port, and a fourth land selectively connecting the seventh port to the eighth port.

4. The hydraulic control system according to claim 1, wherein the second clutch valve fed with hydraulic pressure from the 1–2 speed shift valve, comprising:

a valve body having a first port receiving hydraulic pressure from the 1–2 speed shift valve, a second port feeding hydraulic pressure fed to the first port to the third friction member and the 2–3 speed shift valve, a third port fed with hydraulic pressure from the seventh port of the 2–3 speed shift valve, a fourth port feeding hydraulic pressure fed to the third port to the sixth friction member, a fifth port receiving hydraulic pressure as being connected to the third shift valve, and the sixth port for feeding hydraulic pressure fed to the fifth port to the seventh friction member; and a valve spool having a first land for selectively connecting the first port to the second port, a second land for selectively connecting the third port to the fourth port, a third land for disconnecting the third port with the fifth port, and a fourth land biased by a spring for selectively connecting the fifth port and the sixth port.

5. The hydraulic control system according to claim 1, wherein the third clutch valve comprises:

a valve body having a first port fed with hydraulic pressure from the 2–3 speed shift valve, a second port for feeding hydraulic pressure fed to the first port to the second friction member and the 3–4 speed shift valve at the "2" and "L" ranges, the third port for receiving drive pressure of the manual valve via the eighth port of the 3–4 speed shift valve, and the fourth port for feeding hydraulic pressure fed to the third port to the fifth port of the second clutch valve; and a valve spool having a first land for selectively connecting the first port to the second port, a second land for selectively connecting the third port to the fourth port, and a third land biased by a spring.

6. The hydraulic control system according to claim 1, wherein the fourth clutch valve comprises:

a valve body having a first port for receiving hydraulic pressure from the 3–4 speed shift valve, a second port feeding hydraulic pressure fed to the first port to the fifth friction member, a third port for receiving hydraulic pressure from a line pressure conduit, and a fourth port for feeding hydraulic pressure fed to the third port to the first friction member; and a valve spool having a first land for selectively connecting the first port to the second port, a second land for selectively connecting the third port to the fourth port, and a third land biased by a spring.

7. The hydraulic control system according to claim 1, wherein, when manual shifting from the fourth speed of the "D" range to the second speed of the "2" range, the seventh friction element is controlled by the torque pressure and then replaces the torque pressure with the drive pressure fed from the manual valve.

8. The hydraulic control system according to claim 1, wherein, when manual shifting from the third speed of the "D" range to the first speed of the "L" range, the sixth friction element is controlled by the torque pressure and then replaces the torque pressure with the drive pressure fed from the manual valve.

* * * * *